(No Model.)
G. MÜLLER.
PROCESS OF PRODUCING STERILIZED BUTTER.
No. 523,587. Patented July 24, 1894.
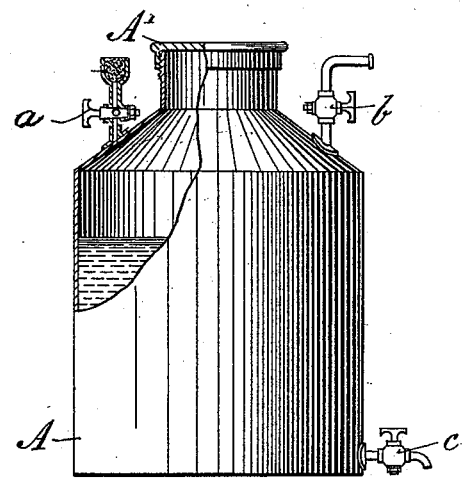
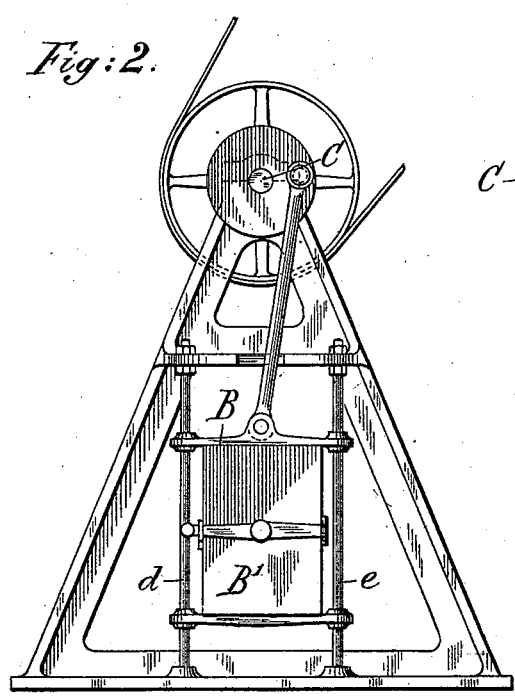
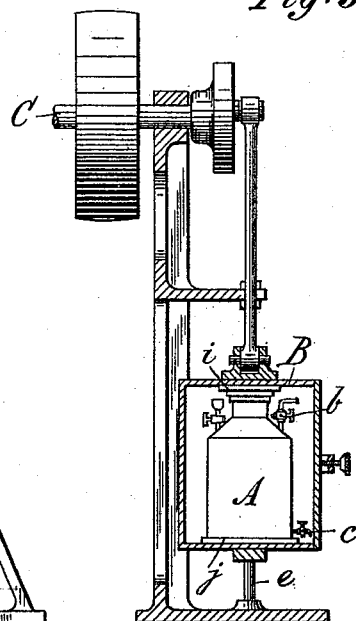
Witnesses
Hermann Gajko
Wilhelm Vogt
Inventor
Gustav Müller
by Heinrich Neubart
Attorney

UNITED STATES PATENT OFFICE.

GUSTAV MÜLLER, OF ZERBST, GERMANY.

PROCESS OF PRODUCING STERILIZED BUTTER.

SPECIFICATION forming part of Letters Patent No. 523,587, dated July 24, 1894.

Application filed April 26, 1892. Serial No. 430,672. (No specimens.) Patented in Germany February 29, 1892, No. 65,391, and in England May 2, 1892, No. 8,264.

*To all whom it may concern:*

Be it known that I, GUSTAV MÜLLER, chemist, of Zerbst, in the German Empire, have invented a certain new and Improved Process of Producing Sterilized Butter, (for which I have obtained a patent in Germany, No. 65,391, dated February 29, 1892, and in England, No. 8,264, dated May 2, 1892,) of which the following is a full, clear, and exact description.

My invention relates to the production of sterilized butter by means of a process, mainly characterized by the fact that the receptacle into which the cream is placed, is not changed during the whole process, the butter being made, ready for use in the same receptacle, as the cream was put at the beginning of the operation. It is well known that the necessary changing of receptacles during the manufacture of butter as practiced up till the present time, is one of the main causes preventing the production of sterilized butter. This is due to the fact that the proper sterilization of the cream is prevented by the same being brought into contact with numerous surfaces, as also by its being necessarily subjected to the action of the air for a considerable length of time. By means of the present process, in which the cream is sterilized, churned, and finally the butter washed in one and the same receptacle a product is obtained, which will keep for a considerable time without depreciating and which contains no pathogenic bacteria. Such butter is particularly suited for children and invalids, and well adapted to stand transport.

The process may be carried out in an apparatus, such as illustrated in the accompanying drawings, although I wish it to be understood that I do not confine myself to this particular construction.

Figure 1 is an elevation partly in section of a receptacle for the cream. Fig. 2 is a front elevation of an apparatus for shaking or churning the cream and for washing the butter. Fig. 3 is an elevation showing the arrangement of the receptacle for the cream in the shaking apparatus.

The receptacle A in which the cream is placed and remains until the butter has been produced is provided with an inlet at the top covered by a screw cap A', and an outlet cock c at the bottom. On one side of the inlet A' are arranged a cock and nozzle b to which a flexible tube is attached, and on the opposite side an air cock a having a funnel shaped mouth piece containing wadding for filtering purposes. By employing this receptacle, which may be of white metal, the process is carried out in the following manner:

The cream from the centrifuges is filled into the receptacle and the latter closed by means of the cap A'. The cock a only is now opened and the receptacle put into a steaming apparatus in order to properly sterilize the cream, which is effected most advantageously by slowly moving, low pressure steam at a temperature of about 103° centigrade. After the sterilization, which takes about half an hour, has been completed the cock a is closed; any air which may have entered being sterilized by the filtering wadding.

The receptacle with its contents should now be allowed to cool down and is then placed in a shaking or churning apparatus in order to produce the butter. The apparatus for this purpose, as represented in Figs. 2 and 3 consists of a casing B guided between two standards d e, and vertically moved up and down by means of the crank shaft C. In order to place the receptacle into the casing B, the door B' should be opened and the said receptacle placed between the two rubber cushions i and j to prevent its displacement during the shaking operation. The door B' should now be securely closed and the apparatus set in motion either by hand or machine power. In a certain space of time, which is dependent on the rate at which the machine is worked, the cream will be turned to butter.

As soon as the butter is formed the whey may be let off by means of the cock c, but in order to do this properly the air cock a should of course also be opened. A sterile rubber tube (shown by dotted lines in Fig. 1) may now be attached to the nozzle of the cock b, said tubing communicating with a water tank of similar construction to the cream receptacle hereinbefore described but without the cock b. This tank should contain sterilized water with which to wash the butter. The cocks *a* and *b* should now be opened and sufficient water to properly wash the butter allowed to pass the receptacle A. After closing all the cocks the latter is again placed in the shaking apparatus which also effects the washing process. The wash water in the receptacle A should be repeatedly renewed, until clear water runs off at *c*. The butter is then shaken again without any addition of water, in order to separate out all the water mechanically combined in the same during the washing process. It may now be removed from the receptacle, formed and packed in foil or sterilized parchment paper.

If it is desired to produce salt or colored butter, sterilized salt or coloring is introduced into the receptacle before the above described dry shaking process takes place, whereby a thorough mixing takes place.

Having now particularly described my invention and the manner of performing the same, what I claim is—

The process of producing sterilized butter, which consists, first in sterilizing the cream, then churning the same, and finally washing the resulting butter with sterilized water, the whole process being carried out in the same vessel, substantially as set forth.

In witness whereof I hereunto set my hand in presence of two witnesses.

GUSTAV MÜLLER.

Witnesses:
WILHELM VOGT,
GUSTAV EGGERT.